United States Patent Office 3,462,390
Patented Aug. 19, 1969

3,462,390
COLOR CONCENTRATES
Michael J. Dunn, New Milford, N.J., assignor to H. Kohnstamm & Co., Inc., New York, N.Y., a corporation of New York
No Drawing. Filed Jan. 24, 1967, Ser. No. 611,230
Int. Cl. C08f 47/04, 47/06
U.S. Cl. 260—41                                                                 13 Claims

ABSTRACT OF THE DISCLOSURE

A color concentrate composition in powder or pellet form comprising a solid polymeric material, at least one pigment and a surfactant composition comprising a mixture of (1) a fatty quaternary ammonium chloride having at least one fatty group and at least one lower alkyl group, and (2) an alkylphenoxy poly(ethyleneoxy) ethanol and the process of manufacturing the color concentrate which comprises mixing a solid polymeric powder and the surfactant composition in a liquid vehicle at a temperature below the melting point of the polymer, adding to this mixture a pigment, mixing all the materials together while maintaining the temperature below the melting point of the polymer and subsequently drying the resulting color concentrate to remove liquid therefrom.

Background of the invention

*Field of the invention.*—This invention relates to novel color concentrate compositions and to the process of manufacturing such compositions.

*Description of the prior art.*—It is known in the art that color concentrates can be prepared by dispersing a pigment in polymer crystals using a high shear mixer such as a Banbury mill. In this process high temperatures and pressures are used which melt the polymer and result in the pigment being dispersed internally in the polymer thereby giving rise to a solid solution. This solid solution cannot be used as a color concentrate. In order to obtain a useful color concentrate, it is necessary to first extrude the solid solution and then chop the extruded material ino pellets. The high temperatures involved in this process prevent the use of those organic pigments which would tend to "brown out" during the manufacturing operation due to the high temperature conditions. Another process heretofore employed comprises mixing a polymer powder and pigment in a blender and extruding the resulting mixture. This extrusion process melts the polymer and also results in the pigment being internally dispersed in the polymer. The extruded product is either converted into pellets or a power by mechanical means.

In both of the aforedescribed processes for obtaining color concentrates, it has been found that there is a tendency for the color to exude out if there is a overloading of pigment; an obviously undesirable result. In addition, the amount of pigment that can be incorporated into the particular polymer using these prior art processes is dependent on the specific gravity of the pigment and also on the polymer. Normally with an organic pigment the maximum loading of pigment is about 25%. This limitation is due to the fact that the pigment is dispersed internally within the polymer and the specific gravity of the pigment determines the amount of loading. It is thus evident that the prior art techniques for manufacturing color concentrates leave much to be desired.

According to the present invention there is provided a color concentrate containing a surfactant composition which bonds the pigment to the surface of the polymer powder. Therefore, the surface area, ascertained by the fineness of grind of the polymer, determines the quantity of color that can be used. With the process of the present invention it is possible to load organic pigments in a quantity substantially greater than 25 percent, the amount of loading being controlled by the surface area of the polymer. Moreover, the process of the present invention eliminates the step of extrusion and pelletization to obtain a useful color concentrate and permits the use of organic pigments which heretofore were not acceptable for manufacturing color concentrates.

Summary of the invention

One aspect of the present invention is to provide a simple and economical process for manufacturing color concentrates in the form of a powder or pellets.

Another aspect of the present invention is to provide a process for manufacturing color concentrates wherein the pigment remains substantially on the surface of the polymer and is bonded thereto by a surfactant composition.

A still further aspect of the present invention is to provide a process for manufacturing color concentrates which have excellent uniformity and intensity of color.

In addition, another aspect of the invention is to provide novel color concentrate compositions which comprise a solid polymer material, a pigment and a surfactant composition which comprises a mixture of (1) fatty quaternary ammonium chloride having at least one fatty group and at least one lower alkyl group and (2) an alkylphenoxy poly(ethyleneoxy) ethanol.

Detailed description of the invention

In accordance with the present invention novel color concentrates are manufactured by mixing together in a liquid vehicle in a homogenizing mixer or the like at rom temperature a polymeric powder with a surfactant composition and subsequently adding a pigment to this mixture to obtain a homogeneous composition of all the ingredients. The composition is then dried by conventional techniques such as in an oven, to remove the liquid vehicle remaining in the colored powder. Thereafter the dried colored powder is placed in a conventional hammer mill to break up occluded particles.

A highly suitable and economical liquid vehicle used in the process of the present invention is water. However, organic vehicles are also useful. The selection of a vehicle is not critical as long as the pigment is insoluble therein and the vehicle does not cause bleeding of the pigment. Exemplary or organic vehicles that may be used are hydrocarbons; halogenated hydrocarbons; ketones; ethers and polyethers; esters; ether-alcohols; alcohols and polyols. Typical suitable organic fluids include aliphatic, cycloaliphatic, aromatic, and terpene hydrocarbons, such as n-heptane, petroleum naphtha, mineral spirits, cyclohexane, benzene, toluene, halogenated compounds, such as trichloroethylene, n-amyl chloride, chlorobenzene, and dichloroethyl ether; ketones, such as acetone, methyl ethyl ketone, methyl i-butyl ketone, diacetone alcohol and cyclohexanone; ethers and polyethers, such as ethyl n-butyl ether, glycol diethyl ether, diethylene glycol diethyl ether; esters, such as ethyl acetate, i-butyl acetate, 2 methoxyethyl acetate; ether alcohols, such as 2-methoxyethanol, diethylene glycol monoethyl ether, and alcohols and polyols, such as ethyl alcohol, n-heptyl alcohol, di-i-butyl carbinol, benzyl alcohol, etc.

The surfactant composition of the present invention comprises a mixture of a cationic material and a nonionic material. The cationic material employed in the composition is a fatty quaternary ammonium chloride having at least one fatty group and at least one lower alkyl group. Among the materials which are suitable for this purpose are di(hydrogenated tallow) dimethyl ammonium chloride, trimethyl lauryl ammonium chloride, trimethyl myristyl ammonium chloride, trimethyl palmityl ammonium chloride, trimethyl oleyl ammonium chloride, trimethyl tallow ammonium chloride, dimethyl dilauryl ammonium chloride, dimethyl dimyristyl ammonium chloride, methyl tricaprylyl ammonium chloride, etc. The nonionic material employed in the surfactant composition is an alkylphenoxy poly(ethyleneoxy) ethanol, which contains from about 23% by weight to about 95% by weight of ethylene oxide. The preferred nonionic material is a nonylphenoxy poly(ethyleneoxy) ethanol containing about 23 percent by weight of ethylene oxide based on the weight of nonylphenol. A useful surfactant composition can be obtained by using from about 5 to about 75 percent by weight of the cationic material and from about 25 to about 95 percent by weight of the nonionic material. Preferably about 80 percent by weight of nonionic material and 20 percent by weight of cationic material is used.

The process of the present invention is useful for manufacturing a color concentrate from any solid polymer available in powder form. Typical solid polymers available in powder form include polyolefins such as polyethylene, polypropylene, polystyrene, etc.; polyvinylchlorides, polyarylene oxides such as polyphenylene oxide; acrylics; celluloses; polymeric halocarbons, etc. The process can be carried out with organic as well as inorganic pigments. There is no restriction on the type of pigment that may be used particularly because the process is carried out at temperatures below the melting point of the solid polymeric powder, preferably at room temperature. At these low temperatures "browning out" of pigments does not occur and therefore pigments can be used which were not heretofore suitable in the high temperature processes of the prior art. Moreover, the drying of the colored powder in an oven does not present any problem as regards "browning out" of the pigment because the temperature of the oven does not exceed normal drying temperatures that are employed for organic pigments. Typical suitable pigments are carbon black, cadmium colors such as cadmium sulfides, sulfoselinides, cadmium selinides and reduced forms of these known as "lithopones" or reduced "toners," titanium dioxide, phthalocyanines, 2B Reds, Red Lake C, Pigment Scarlet Lake, Chrome Yellows, Benzidine Yellows, certified FD&C alumina Lakes ("Lakolene"), Benzidine Oranges, di-nitraniline Orange, Quinacridone Reds, vat colors, iron oxides, etc. This list is merely exemplary and should not be construed as limiting the useful pigments to those listed herein.

The ratio of pigment to polymeric powder varies according to the concentration required. Satisfactory color concentrates have been obtained using as low as 1 percent by weight of pigment and as high as 50 percent by weight based on the weight of the polymer. The surfactant composition is present in the color concentrate in an amount ranging from 0.5 to about 25 percent by weight of the pigment and preferably between about 2 and 10 percent by weight.

The following examples are illustrative of the process and compositions of the present invention.

EXAMPLE 1

A suitable surfactant was prepared by melting 5.3 grams of di(hydrogenated tallow) dimethyl ammonium chloride which is a waxy material and then adding this material to 21.2 grams of nonylphenoxy poly(ethyleneoxy) ethanol containing 23 percent by weight ethylene oxide based on the weight of nonylphenol. This material is a liquid and has been warmed to 100° C. Mixing of these materials may be carried out in a post mixer to obtain a solution of the mixed materials.

EXAMPLE 2

There was introduced into a homogenizing mixer 2000 cc.'s of water and 26.5 grams of the surfactant mixture obtained from Example 1. The water and surfactant are slurried together for ten minutes and then there is slowly added to this mixture 1362 grams of polystyrene powder (general purpose) while stirring the contents of the mixing vessel. After addition of the polystyrene powder is complete, mixing is continued for about fifteen minutes. Thereafter 330 grams of Cadmium Golden Yellow toner are added slowly while mixing the contents and such mixing is continued for about fifteen minutes until a homogeneous mixture is obtained.

The contents of the mixing vessel are then placed on trays and dried in a hot air circulated oven at 175° F. to evaporate off water.

After drying, the colored powder is lumpy and therefore placed in a hammer mill to break up occluded particles. The resulting product is a finely divided colored powder.

The colored powder may be used as such for the coloring of plastics in extrusion, blow molding, injection molding, monofilament and multifilament processes.

EXAMPLE 3

A color concentrate was manufactured following the same method described in Example 2 using the following ingredients:

| | | |
|---|---|---|
| Water | cc | 2000 |
| Surfactant | g | 22.6 |
| Polyethylene powder ("Microethane" 722 available from U.S. Industrial Chemicals) | g | 851.4 |
| $TiO_2$ | g | 283.7 |

The surfactant composition was prepared according to the procedure of Example 1 and comprises 4.52 grams of di(hydrogenated tallow) dimethyl ammonium chloride and 17.08 grams of nonylphenoxy poly(ethyleneoxy) ethanol as defined in that example.

The resulting colored powder is extruded and the extruded product is chopped into pellets which are used for the coloring of plastics.

EXAMPLE 4

A color concentrate was manufactured following the same method described in Example 2 using the following ingredients:

| | | |
|---|---|---|
| Water | cc | 9080 |
| Surfactant | g | 18 |
| Polyphenylene oxide (available from General Electric Co.) | g | 3520 |
| Carbon black | g | 908 |

The surfactant composition was prepared according to the method of Example 1 and comprises 3.6 grams of di(hydrogenated tallow) dimethyl ammonium chloride and 14.4 grams of nonylphenoxy poly(ethyleneoxy) ethanol, prepared as described in that example.

EXAMPLE 5

A color concentrate was manufactured following the same method described in Example 2 using the following ingredients:

| | | |
|---|---|---|
| Water | cc | 2000 |
| Surfactant | | 22.5 |
| Polyvinylchloride (PVC 111–4 available from Dow Chemical Co.) | | 851.4 |
| Cadmium Lithopone Red #813 | | 283.7 |

The surfactant used was the same as in Example 3.

The foregoing examples are merely illustrative of the process of the present invention which may be used with any solid polymer available in powder form and a large variety of inorganic and organic pigments. The process yields color concentrates of excellent uniformity and intensity.

What is claimed is:

1. A process for manufacturing a color concentrate which comprises mixing a polymeric powder with a surfactant composition in a liquid vehicle consisting essentially of water, said surfactant comprising (a) a fatty quaternary ammonium chloride containing at least one fatty group and at least one lower alkyl group and (b) a nonylphenoxy poly(ethyleneoxy) ethanol, adding to said mixture a pigment mixing all of said ingredients until a homogeneous admixture is obtained, and subsequently drying said homogeneous admixture to remove the liquid therefrom, said mixing being carried out at a temperature below the melting point of said polymeric powder.

2. A process according to claim 1 wherein the mixing of said ingredients is carried out at about room temperature.

3. A process according to claim 1 including the additional step of treating said dried colored concentrate by mechanical means to break up occluded particles to obtain a finely divided colored powder.

4. A process according to claim 1 wherein the pigment is present in an amount from about 1 percent to about 50 percent by weight of the polymeric powder and said surfactant is present in an amount from about 0.5% to about 25 percent by weight of the pigment.

5. A process according to claim 1 wherein the fatty quaternary ammonium chloride is di(hydrogenated tallow) dimethyl ammonium chloride.

6. A process according to claim 1 wherein there is about 23 percent by weight of ethylene oxide present in said nonylphenoxy poly(ethyleneoxy) ethanol.

7. A process according to claim 6 wherein about four parts by weight of said nonylphenoxy poly(ethyleneoxy) ethanol are used for each part by weight of said di(hydrogenated tallow) dimethyl ammonium chloride.

8. A process according to claim 1 wherein the polymeric powder is a polyolefin.

9. A color concentrate comprising a pigment, a polymeric powder and a surfactant consisting essentially of mixture of (a) a fatty quaternary ammonium chloride having at least one fatty group and at least one lower alkyl group and (b) a nonylphenoxy poly(ethyleneoxy) ethanol, said pigment being present in an amount from about 1 to about 50 percent by weight of said polymeric powder and said surfactant being present in an amount from about 0.5 to about 25 percent by weight of said pigment and said pigment being substantially all on the surface of said polymeric powder.

10. A color concentrate according to claim 9 wherein the fatty quaternary ammonium chloride is di(hydrogenated tallow) dimethyl ammonium chloride.

11. A color concentrate according to claim 9 wherein there is about 23 percent weight of ethylene oxide present in said nonylphenoxy poly(ethyleneoxy) ethanol.

12. A color concentrate according to claim 10 wherein four parts of weight of said nonylphenoxy poly(ethyleneoxy) ethanol is present in said composition for each part of weight of di(hydrogenated tallow) dimethyl ammonium chloride.

13. A color concentrate according to claim 11 wherein the polymeric powder is a polyolefin powder.

References Cited

UNITED STATES PATENTS

| 3,159,498 | 12/1964 | Davis et al. | 106—300 |
| 3,306,867 | 2/1967 | Popiolek | 260—23 X |

OTHER REFERENCES

Surface Active Agents, Schwartz-Perry, vol. 1, TP 149 S3, 1949, pp. 202–205 relied on.

Plastics Technology, January 1967, p. 33 relied on.

MORRIS LIEBMAN, Primary Examiner

SAMUEL L. FOX, Assistant Examiner

U.S. Cl. X.R.

106—308